United States Patent [19]
Rutschmann

[11] Patent Number: 5,325,666
[45] Date of Patent: Jul. 5, 1994

[54] EXHAUST SYSTEM OF AN INTERNAL-COMBUSTION ENGINE

[75] Inventor: Erwin Rutschmann, Tiefenbronn, Fed. Rep. of Germany

[73] Assignee: Dr. Ing. h.c.F Porsche AG, Fed. Rep. of Germany

[21] Appl. No.: 975,569
[22] PCT Filed: Jul. 10, 1991
[86] PCT No.: PCT/EP91/01287
§ 371 Date: Feb. 4, 1993
§ 102(e) Date: Feb. 4, 1993
[87] PCT Pub. No.: WO92/02715
PCT Pub. Date: Feb. 20, 1992

[30] Foreign Application Priority Data
Aug. 4, 1990 [DE] Fed. Rep. of Germany ....... 4024801

[51] Int. Cl.⁵ ................................................ F01N 3/28
[52] U.S. Cl. ........................................ 60/302; 60/276; 60/288; 60/298; 123/692; 422/171
[58] Field of Search ................. 60/288, 298, 302, 299, 60/276; 123/692; 422/171

*Primary Examiner*—Douglas Hart
*Attorney, Agent, or Firm*—Evenson, McKeown, Edwards & Lenahan

[57] ABSTRACT

The exhaust gases of a two-bank internal-combustion engine are guided, by way of exhaust gas collectors, to a central expansion chamber of a housing. From there, they flow through main catalysts arranged on opposite ends of the housing, before they are guided into the open air by way of end mufflers.

This exhaust system provides a space-saving arrangement of all components required for an optimal emission control, and low exhaust gas back pressure, and meets all acoustic requirements.

23 Claims, 3 Drawing Sheets

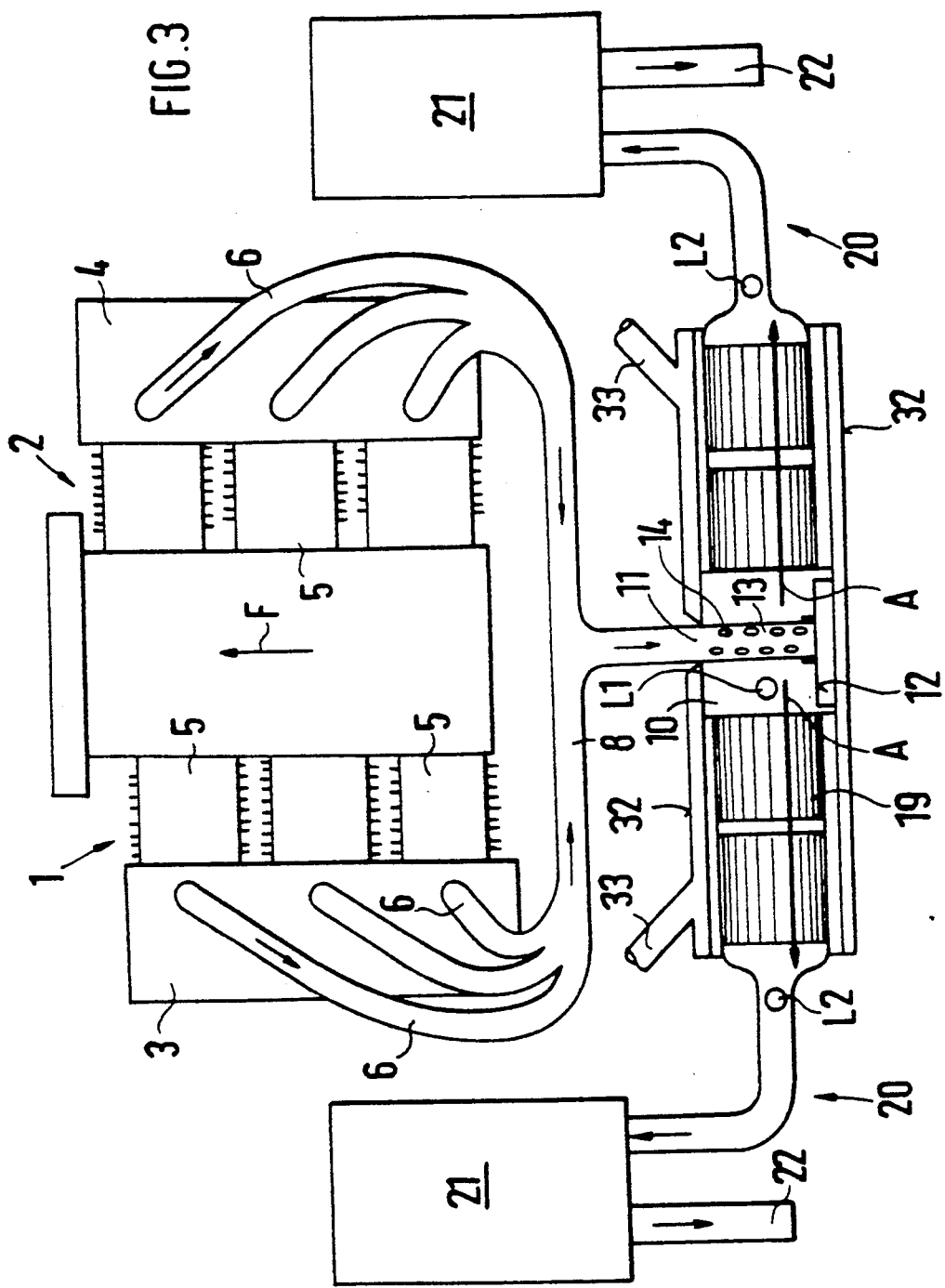

EXHAUST SYSTEM OF AN INTERNAL-COMBUSTION ENGINE

BACKGROUND AND SUMMARY OF THE INVENTION

The invention relates to an exhaust system of a multi-cylinder internal-combustion engine, the exhaust gases of which are guided by means of a collector approximately centrically to a housing which has catalysts at opposite ends, all exhaust gas being lead out to the open air downstream of the catalysts.

In the German Patent Document DE- 2 452 675, an exhaust system is disclosed in which the exhaust gases flow by way of a collector into an interior housing surrounded by an exterior housing. In this case, the exhaust gases first reach an afterburning chamber in a central manner and are guided from there as separate flows through two catalysts arranged on opposite ends of the interior housing into the exterior housing, in which the exhaust gas flows are mixed again and reach the open air by way of a common exhaust.

From the German Patent Document DE- 21 17 771, an exhaust system is known in which pipe sections, which extend from one cylinder bank respectively of the internal-combustion engine into a muffler, have a perforated construction inside this muffler. The German Patent Document DE-39 30 380 shows an exhaust system of a multi-cylinder internal-combustion engine in which starting catalysts are connected into the exhaust pipes which are connected directly to the cylinder head, which starting catalysts have a central duct, which can be closed by a flap, and a ring duct which surrounds it and contains the catalyst material.

The invention is based on the object of providing an exhaust system for an internal-combustion engine which, while its arrangement is space-saving, has a low exhaust back pressure and achieves an optimal exhaust emission control.

This object is achieved by means of an arrangement of the above-noted type wherein the collector is provided with an end piece which projects into an expansion chamber which is centrally arranged in the housing.

The low exhaust back pressure is achieved by the central arrangement of the expansion chamber and the complete symmetrical acting upon the catalysts which follows.

The discharge of the exhaust gases flowing through the catalysts by way of separate exhausts also provides a symmetrical low exhaust back pressure. Furthermore, the central position of the expansion chamber permits a space-saving arrangement of this chamber and of the adjacent catalysts in a common housing. The exhaust gases can be guided to the catalytic emission control system by way of short pipes and lines. Thus, the catalysts rapidly reach their temperature required for an optimal emission control.

The flowing of the exhaust gases into the expansion chamber arranged centrally in the housing and the dividing into two separate exhaust gas flows that takes place there, which exhaust gas flows act directly, without any reduction of the cross-section, upon the main catalysts by way of large-surface perforated metal sheets, permits a fast parallel flowing through the main catalyst monoliths and the subsequent discharging of the purified exhaust gases by way of one separate exhaust respectively.

The low exhaust back pressure promotes a good power development of the internal-combustion engine while the fuel consumption is reduced at the same time. The arrangement of the housing transversely with respect to the longitudinal direction of the internal-combustion engine permits a symmetrical arrangement of the lines and offers a large space for the housing of the main catalysts. A large catalyst volume is the prerequisite for a long working life of the catalyst.

A damper volume surrounding the catalysts acts in a damping manner together with the expansion chamber arranged in front of the main catalysts which, on the one hand, results in acoustic advantages and, on the other hand, reduces pressure peaks in the exhaust gas flow which otherwise may result in damage to the catalysts or to the whole housing. The large volume of the exhaust system has a damping effect on pressure fluctuations.

According to the working volume of the internal-combustion engine and according to acoustic requirements, all exhaust pipes together may be guided in an exhaust collector into the expansion chamber or a separate collector may be assigned to one cylinder bank respectively.

For acoustic and fluidic reasons as well as because of the component strength, it was found to be advantageous to close the end pieces of the collector in the expansion chamber at the end and to let the exhaust gases flow out by way of openings on their lateral surface.

In order to meet also the strictest emission control regulations, starting catalysts may be inserted in the exhaust collector or collectors whose small monolith mass, because of the arrangement close to the combustion chamber, reaches its working temperature particularly fast.

These starting catalysts may have, for example, as switchable catalysts, ring-shaped monoliths which surround an at first closed central duct. After the working temperature of the main catalysts has been reached, the central duct is opened up so that the exhaust gas will no longer flow through the monoliths. For a particularly fast-acting emission control, a separate starting catalyst, which is inserted in the respective exhaust pipe, may be assigned to each individual cylinder of the internal-combustion engine.

In an advantageous development of the invention, the housing may be constructed in a double-walled manner as a heat exchanger and may be provided with connection pieces. By way of these connection pieces, the fresh air to be heated is supplied which is heated by the energy contained in the exhaust gases and is then, by way of additional connection pieces, supplied, for example, to the interior of a vehicle equipped with such an exhaust system.

For the control of the fuel-air mixture of the internal-combustion engine and for the monitoring of the operability of the catalysts, several lambda probes are arranged in the exhaust system. The control of the mixture, in this case, is carried out by, in each case, one or two first lambda probes arranged upstream of the catalysts, while second or third probes arranged downstream of catalysts are used for the catalyst monitoring.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic view from below of a third embodiment of the invention; and FIG. 4 is a sectional view along Line IV—IV according to FIG. 1.

DETAILED DESCRIPTION OF THE DRAWINGS

Figure 1:
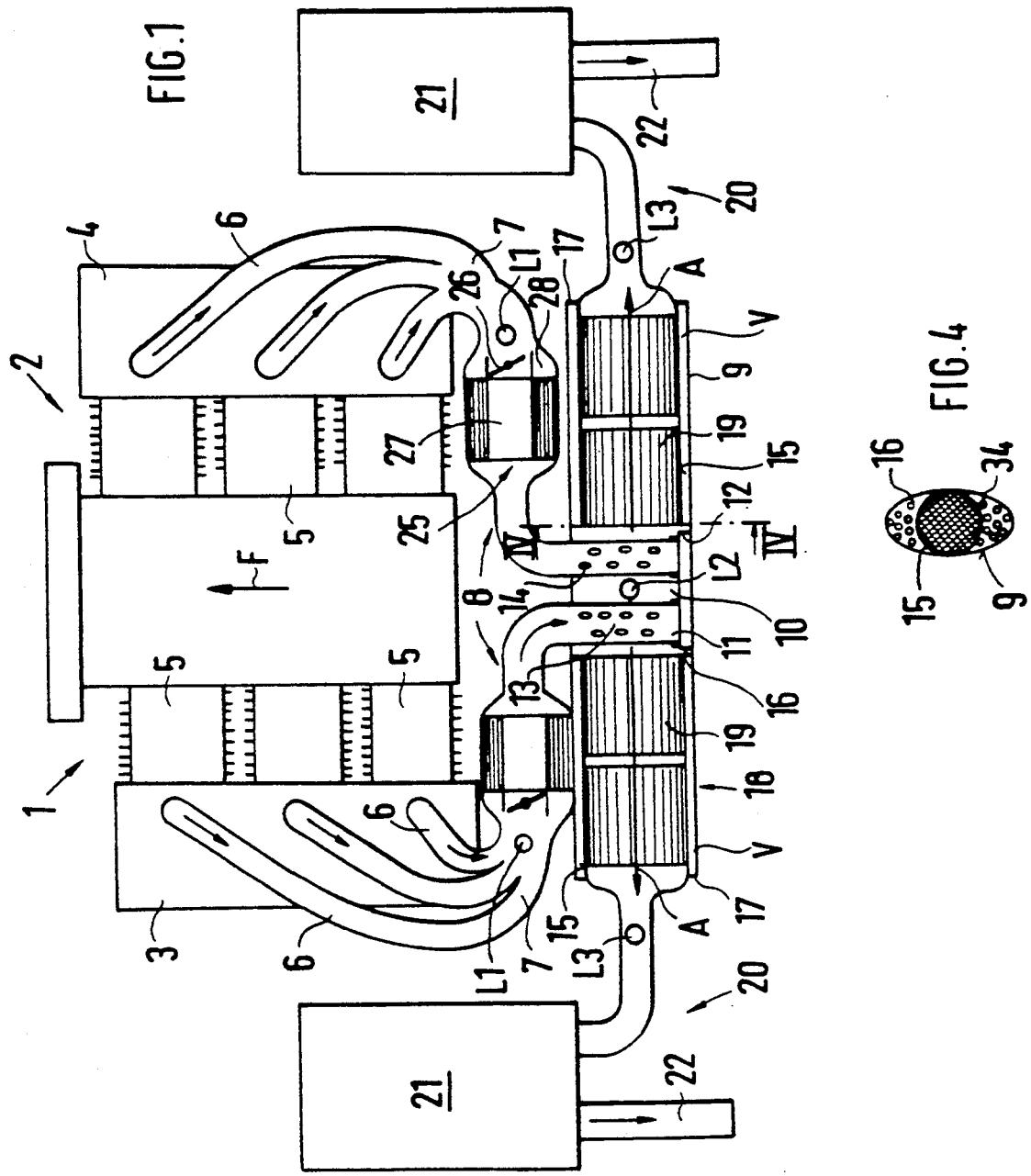
FIG. 1 is a schematic view from below of a first embodiment of the invention.

An internal-combustion engine installed in a motor vehicle has two cylinder banks 1, 2 in an opposed arrangement. On the cylinder heads 3, 4, exhaust pipes 6 are arranged which start out from individual cylinders 5 and are brought together in one connection piece 7 for each cylinder bank 1, 2. Exhaust collectors 8 are connected to these connection pieces 7 and feed the exhaust gas of the cylinder banks 1, 2 to a housing 9. This housing 9 extends on the end face of the internal-combustion engine transversely to its longitudinal direction F and has an oval-surface cross-section (FIG. 4). The two lines 8 with the end pieces 11, which are closed with a cover 12 at the end and have radial openings 14 on their lateral surface 13, lead perpendicularly into a centrally disposed expansion chamber 10.

On both sides of the chamber 10, a circular pipe section 15 is arranged which bounds the chamber 10 by means of a face-side perforated metal sheet 16 and is held, at its end, in a closing lid 17 of the housing 9. Inside the section 15, two monoliths 19 are axially spaced which form a main catalyst 18. Thus, a damping volume V is formed between the housing 9, a closing lid 17, a metal sheet 16 and a pipe section 15 respectively.

On both sides outside the housing 9, an exhaust 20 for the exhaust gases is arranged which comprises an end muffler 21 connected with the closing lid 17 as well as an end pipe 22 connected with the open air.

According to a first embodiment of the invention (FIG. 1), switchable starting catalysts 25 are arranged in the collectors 8, which starting catalysts 25 have a central duct 27 which can be closed by means of a flap 26 and have a ring duct 28 containing the catalyst material. The collectors 8 may be guided together before they enter into the expansion chamber 10 so that only an end piece 11 is arranged centrically in this chamber 10 (FIG. 3).

For the monitoring of the operatability of the main and starting catalysts 18, 25 as well as for the control of the fuel-air mixture fed to the internal-combustion engine, several lambda probes are arranged in the exhaust system which detect the oxygen content in the exhaust gas. Two first probes L1 are arranged upstream of the starting catalysts 25; a second probe L2 is arranged in the expansion chamber 10 and two third probes L3 are arranged downstream of the main catalysts 18.

Figure 2:
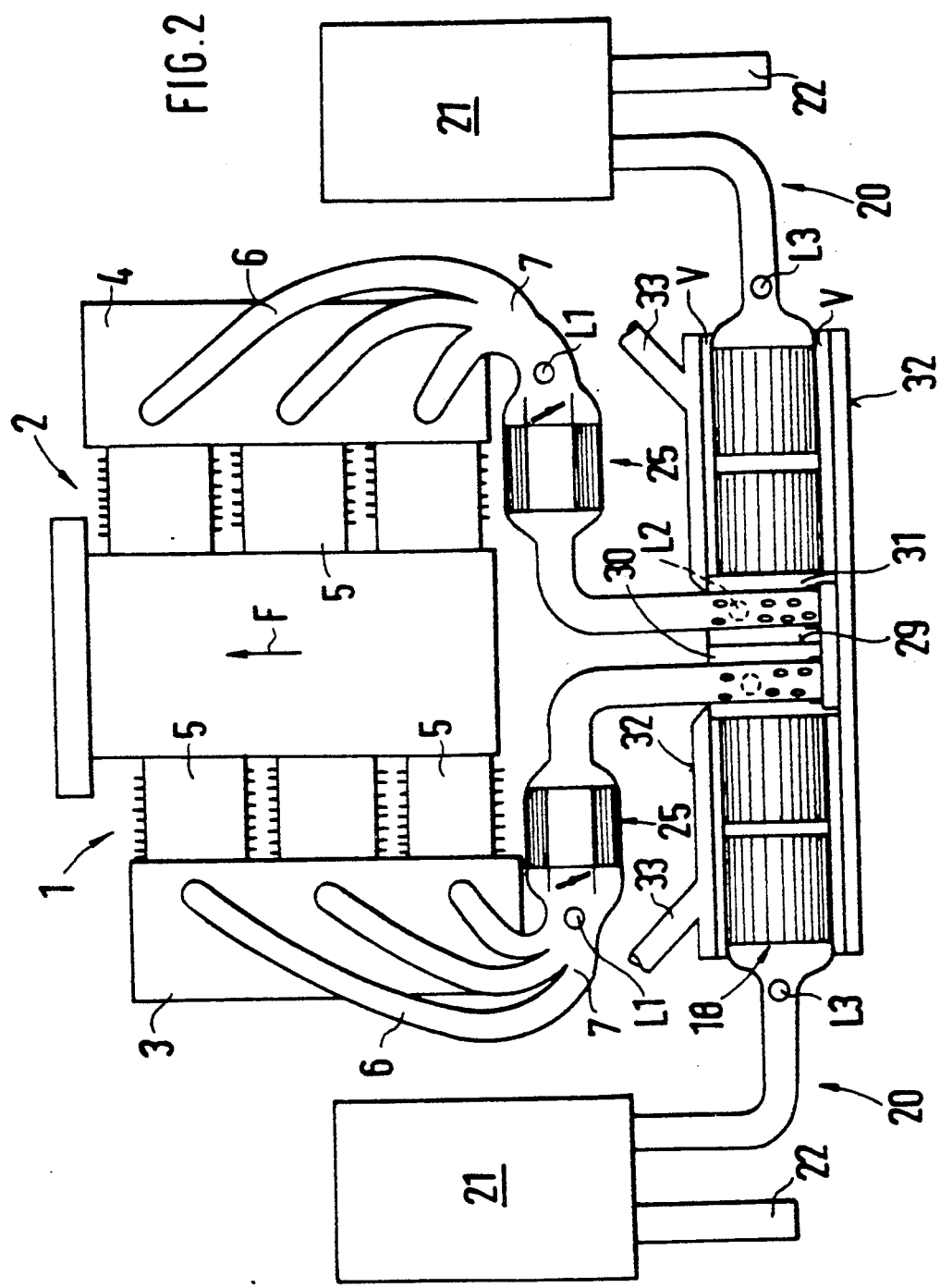
FIG. 2 is a schematic view from below of a second embodiment of the invention.

In a second embodiment according to FIG. 2, the expansion chamber 10 is divided by means of a wall 29 into two partial chambers 30, 31, one end piece 11 respectively leading into the partial chamber 30, 31. In this case, one lambda probe L2 is arranged in each partial chamber 30, 31.

According to this embodiment, the housing 9 is constructed in a double-walled manner as a heat exchanger 32. By way of an inlet, which is not shown, fresh air to be heated is fed to the heat exchanger 32. This fresh air is heated by means of the thermal energy contained in the exhaust gases and, by way of connection pieces 33, is guided as heating air into the interior of the motor vehicle.

In both embodiments of the invention, instead of a starting catalyst 25 in a collector 8, a separate starting catalyst 25 may be assigned to each exhaust pipe 6 of a cylinder 5.

The third embodiment according to FIG. 3 shows an exhaust system without starting catalysts 25, in which the exhaust collectors 8 are brought together before entering into the expansion chamber 10 and lead into this chamber 10 by means of a joint end piece 11; however, two end pieces 11 according to FIG. 1 may also be provided. A first lambda probe L1 is arranged in the chamber 10 and a second probe L2 is in each case arranged downstream of the main catalysts 18.

The heat exchanger 32 may be optionally provided in the case of all mentioned embodiments.

The respective first lambda probes L1 are used for controlling the fuel-air mixture; the second and third probes L2 and L3 are used for the monitoring of the catalysts 18, 25.

Since a control is always desired that is as fast as possible, in the third embodiment (FIG. 3), one first probe L1 respectively may be arranged in each connection piece 7. By means of the differential signal between the first and second or second and third probes L1, L2 or L2, L3, the operatability of the catalysts 18, 25 is monitored.

During the operation of the internal-combustion engine, the exhaust gases are guided in the exhaust system along the entered arrows. Immediately after the start of the internal-combustion engine, when the central duct 27 is closed, the exhaust gas is guided via the ring ducts 28 where it rapidly heats up the comparatively small starting catalysts 25 and therefore causes an early exhaust gas purification.

In a manner not described in detail, the flaps 26 open up the central duct 27 when the light-off temperature of the main catalysts 8 is reached, so that the exhaust gases, following the path of the lowest resistance, no longer flow through the ring duct 28 or flow through the ring duct 28 only to a slight extent, whereby the service life is increased.

Subsequently, the collectors 8 lead the exhaust gas by way of the end pieces 11 to the expansion chamber 10. According to the first and third embodiment, the exhaust gases of all cylinders 5 of the internal-combustion engine are mixed at the latest in the chamber 10, are then divided into two identical exhaust gas flows A which flow through the main catalysts, and are then lead into the open air through one exhaust 20 respectively.

According to the second embodiment of the invention, no mixing takes place of the exhaust gas of the cylinder banks 1, 2 as a result of the wall 29. In this case, the exhaust gas is guided and treated completely separately for each cylinder bank 1, 2.

In all embodiments, the damping volume V is coupled to the volume of the expansion chamber 10 by way of breakthroughs 34 (FIG. 4) in the metal sheets 16.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An exhaust system of a multi-cylinder internal-combustion engine, the exhaust gases of which are guided by means of a collector approximately centrally to a housing which has catalysts at opposite ends, all exhaust gas being led out to the open air downstream of the catalysts, wherein the collector is provided with an end piece which projects into an expansion chamber which is centrally arranged in the housing, said end piece being provided with radial openings on its lateral surface.

2. A system according to claim 1, comprising cylinders combined in two banks and exhaust pipes leading from the cylinders to the collector, wherein a collector is assigned to each cylinder bank and leads by means of an end piece into the expansion cylinder, each said end piece being provided with radial openings on its lateral surface.

3. A system according to claim 1, wherein the housing extends transversely with respect to the longitudinal direction (F) of the internal-combustion engine.

4. A system according to claim 1, wherein the expansion chamber is cylindrically constructed, and wherein the end pieces lead perpendicularly into the cylindrically constructed expansion chamber.

5. A system according to claim 2, wherein the end pieces are closed at the end.

6. A system according to claim 2, wherein each exhaust gas collector has a catalyst.

7. A system according to claim 6, wherein each starting catalyst has a closable central duct and a ring duct which surrounds it and contains the catalyst material.

8. A system according to claim 1, wherein the housing is constructed in a double-walled manner as a heat exchanger provided with connection pieces which heats fresh air means of the thermal energy of the exhaust gases.

9. A system according to claim 2, wherein a wall bounding partial chambers is arranged in the expansion chamber between the end pieces.

10. A system according to claim 1, wherein lambda probes are arranged upstream of at least one catalyst.

11. A system according to claim 2, wherein the catalysts include at least one starting catalyst and at least one main catalyst, and wherein lambda probes are arranged upstream of each starting catalyst and downstream of each main catalyst and in the expansion chamber.

12. A system according to claim 2, wherein a separate starting catalyst is assigned to each exhaust pipe.

13. A system according to claim 4, wherein each exhaust gas collector has a catalyst.

14. A system according to claim 5, wherein each exhaust gas collector has a catalyst.

15. A system according to claim 4, wherein lambda probes are arranged upstream of at least one catalyst.

16. A system according to claim 6, wherein lambda probes are arranged upstream of at least one catalyst.

17. A system according to claim 4, wherein the catalysts include at least one starting catalyst and at least one main catalyst, and wherein lambda probes are arranged upstream of each starting catalyst and downstream of each main catalyst and in the expansion chamber.

18. A system according to claim 4, wherein the catalysts include starting catalysts, and wherein a separate starting catalyst is assigned to each exhaust pipe.

19. A system according to claim 1, wherein lambda probes are arranged downstream of at least one catalyst.

20. A system according to claim 4, wherein lambda probes are arranged downstream of at least one catalyst.

21. A system according to claim 6, wherein lambda probes are arranged downstream of at least one catalyst.

22. An exhaust system of a multi-cylinder internal-combustion engine, the exhaust gases of which are guided by means of a collector approximately centrally to a housing which has catalysts at opposite ends, all exhaust gas being led out to the open air downstream of the catalysts, wherein the collector is provided with an end piece which projects into an expansion chamber which is centrally arranged in the housing, and wherein lambda probes are arranged upstream of at least one catalyst.

23. An exhaust system of a multi-cylinder internal-combustion engine, the exhaust gases of which are guided by means of a collector approximately centrally to a housing which has catalysts at opposite ends, all exhaust gas being led out to the open air downstream of the catalysts, wherein the collector is provided with an end piece which projects into an expansion chamber which is centrally arranged in the housing, and wherein lambda probes are arranged upstream of at least one catalyst.

* * * * *